United States Patent [19]

Boux et al.

[11] 3,975,640

[45] Aug. 17, 1976

[54] PROCESS FOR CENTERING AN IONIZING RADIATION SWEEP BEAM AND DEVICE FOR CARRYING OUT THIS PROCESS

[75] Inventors: René Boux; Jean Noël Bourlier, both of Paris, France

[73] Assignee: C.G.R.-Mev., Paris, France

[22] Filed: June 3, 1975

[21] Appl. No.: 583,290

[30] Foreign Application Priority Data

June 7, 1974 France ............................ 74.19833

[52] U.S. Cl. ................................ 250/385; 250/397

[51] Int. Cl.[2] ...................... G01T 1/16; H01J 39/28

[58] Field of Search .......... 250/382, 385, 394, 396, 250/397, 398, 399

[56] References Cited

UNITED STATES PATENTS

| | | | |
|---|---|---|---|
| 3,808,441 | 4/1974 | Boux | 250/385 X |
| 3,838,284 | 9/1974 | McIntyre et al. | 250/399 X |
| 3,845,310 | 10/1974 | Perraudin | 250/385 |

*Primary Examiner*—Davis L. Willis
*Attorney, Agent, or Firm*—Cushman, Darby & Cushman

[57] ABSTRACT

A centering process for detecting the centering errors of a sweep beam impinging on a target and correcting them, this process comprising comparing a signal $V_E$, corresponding to the difference between electric signals received on the two halves of an electrode, with threshold voltages $\pm v_e$ and comparing a signal $V_B$, corresponding to the voltage controlling the sweep of the beam, with threshold voltages $\pm v_b$, the transmission of a signal $V_p$ corresponding to $V_E < + v_e$ and $V_B < - v_b$ (or of a signal $v_n$ corresponding to $V_E < - v_e$ and $V_B > + v_b$) indicating the direction of the centering error and its amplitude. The process permits controlling the centering of a sweep beam on secant axes making an angle $\theta$ therebetween.

8 Claims, 6 Drawing Figures

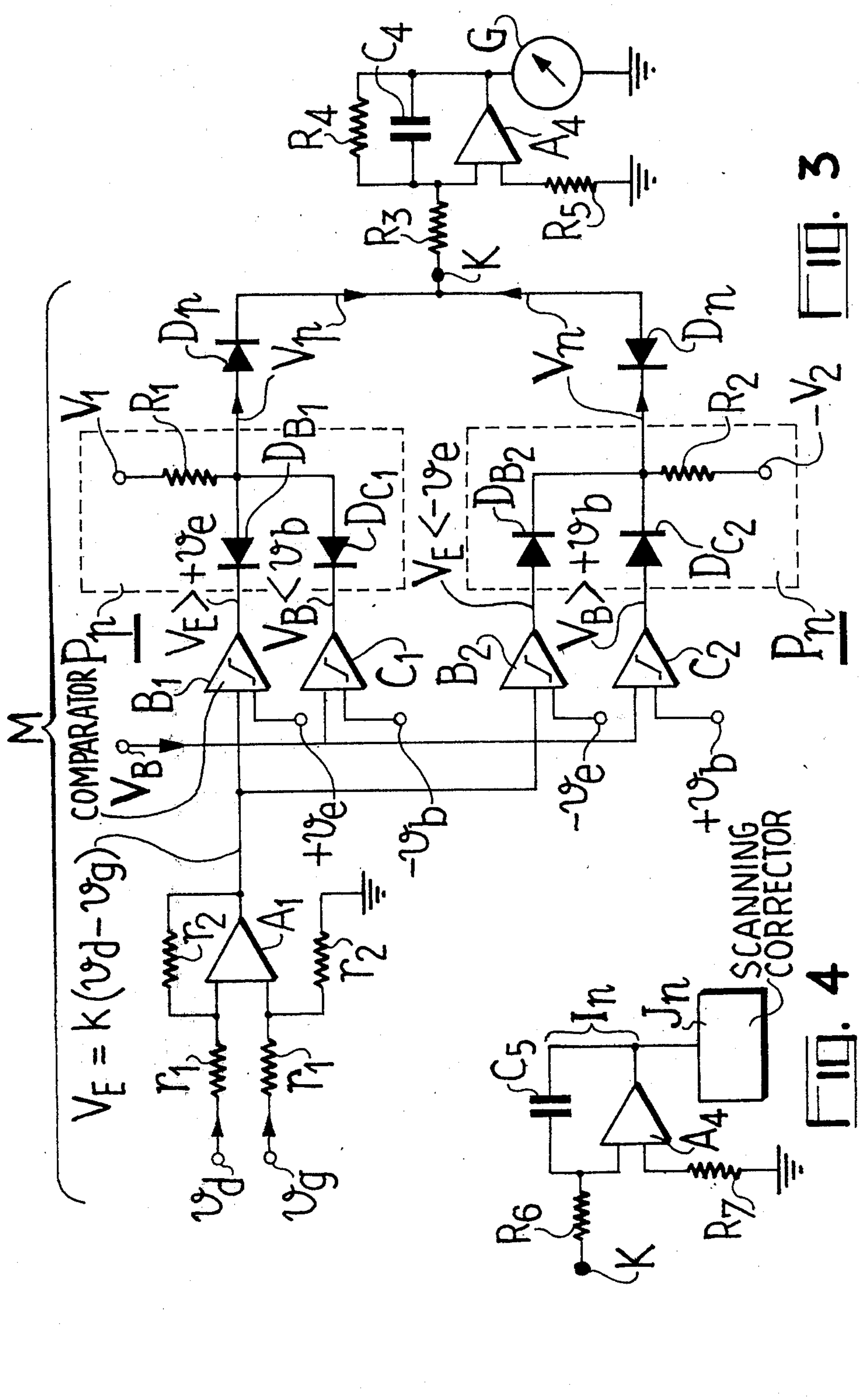
COMPARATOR
SCANNING CORRECTOR

PROCESS FOR CENTERING AN IONIZING RADIATION SWEEP BEAM AND DEVICE FOR CARRYING OUT THIS PROCESS

The invention relates to a process for centering an ionizing radiation sweep beam with respect to a target of predetermined position and a device for carrying out this process.

When a radiation beam is of small diameter with respect to the area to receive the radiation, this area can be swept by the beam but, in this case, the centering of the beam with respect to the target or the zone to receive the radiation is not easy and a defective centering leads to a defect in the homogeneity of the radiation which may result in serious drawbacks when the beam is employed in radiotherapy for example.

The intensity of an ionizing radiation may be measured by means of ionization chambers provided with electrodes divided into a plurality of elements allowing simultaneously to measure the homogeneity of the ionizing radiation beam and also its centring. Generally, the dimensions of the ionizing radiation beam are substantially equal to those of the zone to receive the radiation and the dimensions of the surface of the electrode are very close thereto.

However, in the case where the dimensions of the beam are much less than those of the zone to receive the radiation and it is necessary to employ a sweep beam, the control of the centering of such a beam with respect to the target may be achieved by means of a galvanometer whose spot follows the displacement of the beam. But as this spot permanently oscillates, the center of this oscillation, which is offset with respect to the center of the target when the sweep beam is not suitably centered, is difficult to locate. Such a control means is therefore imprecise whereas the control process according to the invention may ensure the centering of the sweep beam with an excellent precision.

According to the invention, a process for centering, with respect to a target of predetermined position, an ionizing radiation sweep beam subjected to a sweep control voltage $V_B$ in a predetermined plane, using at least one ionization chamber provided with at least one electrode divided into $2n$ electrically conductive elements, $n$ being an integer equal to or greater than 1, said elements being disposed symmetrically with respect to an axis perpendicular to the considered sweep plane said electrode into two equal parts, two adjacent elements being separated from each other by an insulating strip, all of the elements disposed on one side of said axis receiving an ionic current $i_d$ and all of the elements disposed on the other side of said axis receiving an ionic current $i_g$, said process comprising the following steps:

amplifying the voltage difference $v_d - v_g$ respectively corresponding to the currents $i_d$ and $i_g$ received at said electrode, the signal obtained being $V_E = k\,(v_d - v_g)$;

comparing the signal $V_E$ with threshold voltages $-v_e$ and $+v_e$;

comparing the beam sweep control voltage $V_B$ with threshold voltages $-v_b$ and $+v_b$;

detecting either a signal $V_p$ corresponding to the couple of values:

$$V_p \rightarrow \begin{matrix} V_E > +v_e \\ V_B < -v_b \end{matrix}$$

or a signal $V_n$ corresponding to the couple of values:

$$V_n \rightarrow \begin{matrix} V_E < -v_e \\ V_B > +v_b \end{matrix}$$

said detected signals $V_p$ or $V_n$ indicating the direction and amplitude of the deviation of the centering of the sweep beam with respect to said axis of the electrode;

correcting the sweep path of said beam, said correcting being related to the detected signal $V_p$ or $V_n$.

Also according to the invention, a sweep beam centering device for carrying out this process comprises at least an error control system and correcting means, said error control system comprising:

an amplifier $A_1$ delivering a signal $V_E$ corresponding to the difference between said voltages $v_d$ and $v_g$ respectively corresponding to the currents $i_d$ and $i_g$;

two comparators $B_1$ and $B_2$ for comparing the signal $V_E = k(v_d - v_g)$ with threshold voltages $-v_e$ and $+v_e$, said comparator $B_1$ transmitting the signal $V_E > +v_e$ and said comparator $B_2$ transmitting the signal $V_E < -v_e$;

two comparators $C_1$ and $C_2$ for comparing said beam sweep voltage $V_B$ with threshold signals $-v_b$ and $+v_b$ and transmitting respectively the signals $V_B < -v_b$ and $V_B > +v_b$;

an "AND" gate for transmitting a signal $V_p$ corresponding to the couple of values:

$$V_E > +v_e$$

and $$V_B < -v_b$$

an "AND" gate for transmitting a signal $V_n$ corresponding to the couple of values:

$$V_E < -v_e$$

and $$V_B > +v_b$$

said correcting means comprising at least:

two diodes $D_p$ and $D_n$ for respectively transmitting the signals $V_p$ and $V_n$ to a correcting system effecting a correction of said beam sweep control voltage $V_B$, the direction and amplitude of this correction being directly related to the detected signal namely either $V_p$ or $V_n$.

For a better understanding of the invention and to show how the same may be carried into effect, reference will be made to the drawings, given solely by way of example, which accompany the following description, and wherein:

FIG. 3 shows diagrammatically a centering device according to the invention;

FIG. 4 shows an embodiment of a detail of a device according to the invention;

FIG. 1 shows an electrode E, as employed in an ionization chamber for controlling the centering, the intensity and the homogeneity of the ionizing radiation sweep beam F. This electrode E comprises two electrically conductive elements $e_d$ and $e_g$ insulated from each other by an insulating strip $b_i$ disposed on an axis XX dividing the electrode E into two equal parts.

When the sweep beam F is suitably centered with respect to the electrode E, the mean path of the beam, obtained for a zero sweep control voltage $V_B$, corresponds to a difference $v_d - v_g = 0$, $v_d$ and $v_g$ being the voltages respectively corresponding to the currents $i_d$ and $i_g$ received by the elements $e_d$ and $e_g$.

When a value of $i_d - i_g \neq 0$ corresponds to the sweep control voltage $V_B$, the beam is off-center with respect to the electrode E, and therefore with respect to the target which receives the radiation whose axis coincides with the axis A — A perpendicular to the electrode at its center.

Figure 2:
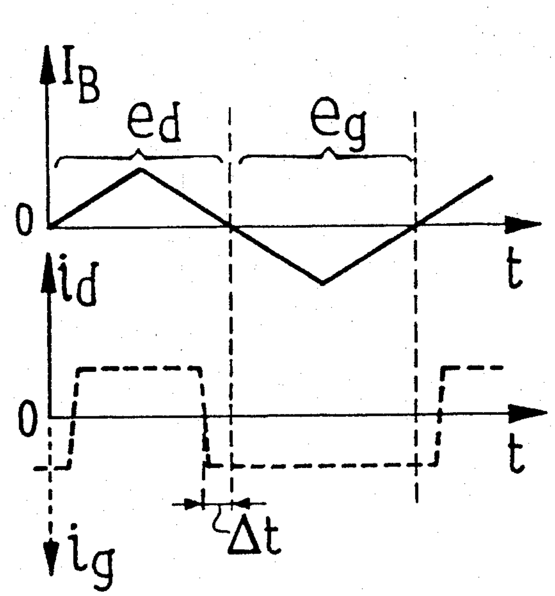
FIG. 2 shows the simultaneous variations, as a function of time, of the current $I_B$ controlling the sweep of a beam F and the ionic current measured on the elements of an electrode of an ionization chamber (ionic current $i_d$ or $i_g$)

FIG. 2 gives an example of simultaneous variations in the sweep control current $I_B$ as a function of time and of the current $i_d$ and $i_g$ respectively measured on the elements $e_d$ and $e_g$ of the electrode E. In the considered example, the sweep control voltage $V_B$ is of the symmetrical sawtooth type, which is very suitable for the control of an electromagnet, but it will be understood that it is possible to employ other type of sweep. FIG. 2 shows that the beam F is off-center to the left.

The centering device according to the invention as shown in FIG. 3 permits determining with precision the direction and amplitude of the centering error and correcting this error either manually or automatically.

This centering device comprises an error control system M based on the following principle:

The amplified difference $V_E$ of the voltages $v_d$ and $v_g$ corresponding to currents $i_d$ and $i_g$ respectively received on the elements $e_d$ and $e_g$ of the electrode E is compared with threshold voltages $+ v_e$ and $- v_e$ which take into account noise.

Simultaneously, the sweep voltage $V_B$ is compared with threshold voltages $- v_b$ and $+ v_b$ taking into account noise. $V_B < - v_b$ corresponding to a sweep to the left, $V_B > + v_b$ to a sweep to the right for example. A first "AND" gate transmits a signal $V_p$ if the condition:

$$V_E > + v_e$$

$$V_B < - v_e$$

is satisfied, which corresponds to $v_d > v_g$ (beam to the right) whereas the path of the beam is to the left of the mean path ($V_B < - v_e$). The detection of the signal $V_p$ indicates therefore that the beam is off-center to the right and that a correction to the left is required. A second "AND" gate transmits a signal $V_n$ corresponding to the couple of values:

$$V_E < - v_e$$

$$V_B > + v_b$$

The detection of this signal $V_n$ indicates that a correction of the beam to the right is required. These corrections may be carried out automatically.

The error control system of the centering device according to the invention shown in FIG. 3 comprises a difference amplifier $A_1$ associated with resistors $r_1$ and $r_2$ which provides an amplifier signal $V_E$ of the difference $v_d - v_g$.

Comparators $B_1$ and $B_2$ permit a comparison of this signal $V_E$ with threshold voltages $- v_e$ and $+ v_e$ and therefore the determination of the position of the beam F with respect to the axis XX of the electrode E.

Comparators $C_1$ and $C_2$ permit a simultaneous comparison of the sweep control voltage $V_B$ with the threshold voltages $- v_b$ and $+ v_b$, that is to say determine the direction of the sweep voltage $V_B$.

The comparators $B_1$ and $C_1$ are associated with an "AND" gate, $P_p$, followed by a diode $D_p$ transmitting the signal $V_p$ corresponding to the values $V_E > + v_e$ and $V_B < - v_b$.

The comparators $B_2$ and $C_2$ are associated with an "AND" gate, $P_n$, followed by a diode $D_n$ transmitting the signal $V_n$ corresponding to the valued:

$$V_E < - v_3 \text{ and } V_B > + v_b$$

The signal $V_p$ or $V_n$ transmitted by one of the diodes $D_p$ (or $D_n$) is then applied for example through a difference amplifier $A_4$ associated with resistors $R_3$, $R_4$, $R_5$ and a capacitor $C_4$, to the terminals of a galvanometer (FIG. 3), the position of the spot of the galvanometer G indicating the direction and amplitude of the correction to be made. This correction may be made manually or made automatically by means of an integrator $I_n$ such as that shown in FIG. 4, this integrator $I_n$ controlling a scanning corrector $J_n$ for correcting the voltage $V_B$ controlling the sweep of the beam F.

Figure 1:
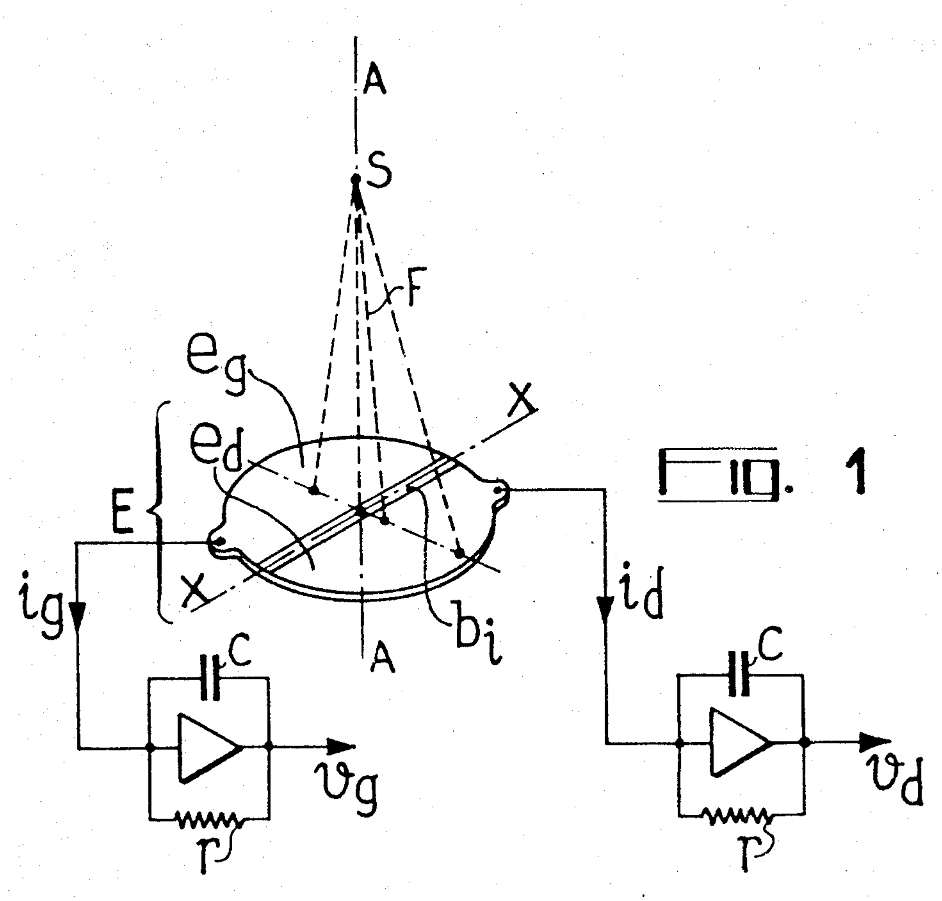
FIG. 1 shows an embodiment of an electrode for controlling the centering of a sweep beam in the sweeping plane, as used in a device according to the invention.

The embodiments given in FIGS. 1, 2 and 3 apply to the centering of a sweep beam F whose paths are contained in a plane. The centering is made with respect to an axis XX perpendicular to this plane.

A device according to the invention also permits a centering of the beam with respect to two axes making therebetween a certain angle $\theta$ (for example two orthogonal axes). There may be employed in this case an electrode $E_o$ divided into four elements $e_1$, $e_2$, $e_3$, $e_4$, as shown in FIG. 5, or two electrodes $E_1$ and $E_2$ each divided into two elements $e_{11}$, $e_{12}$ and $e_{21}$, $e_{22}$, the axis $X_1X_1$ separating the two elements $e_{11}$, $e_{12}$ of the electrode $E_1$ being for example disposed at 90° to the axis $X_2X_2$ separating the two elements $e_{21}$, $e_{22}$ of the electrode $E_2$ (FIG. 6).

Figure 5:
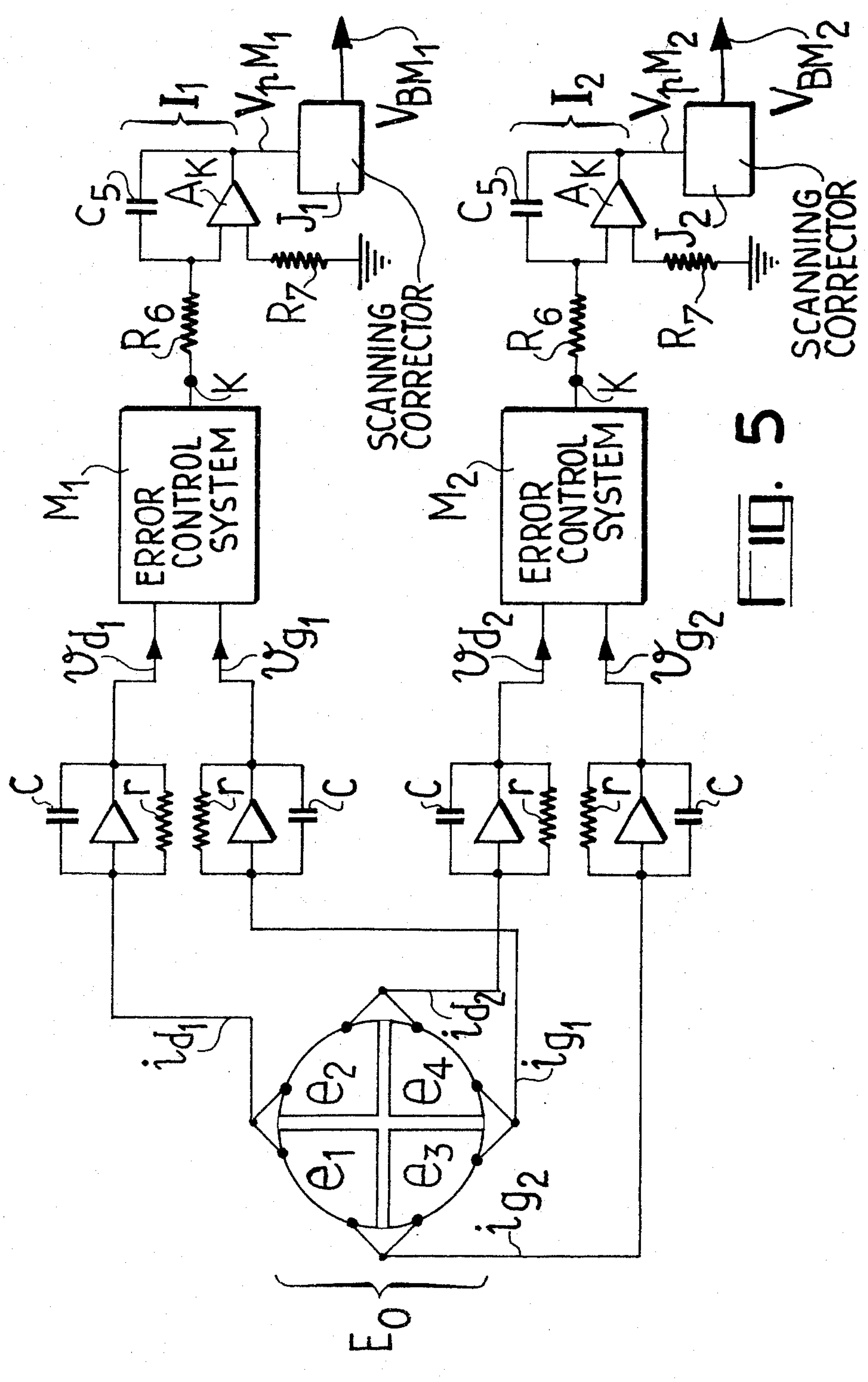
FIGS. 5 and 6 show two other embodiments of a device according to the invention.
Figure 6:
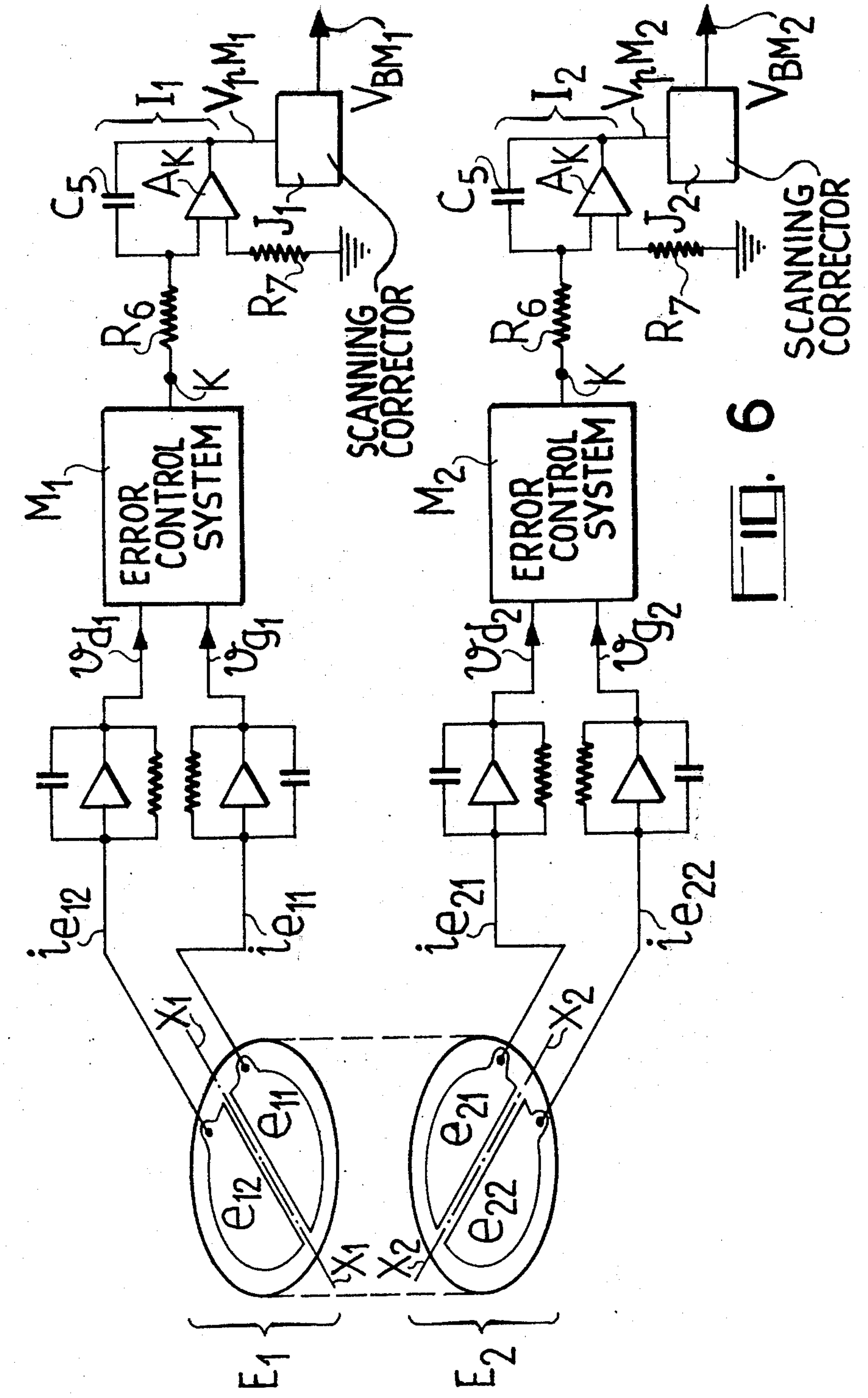

The centering control device associated with the electrode $E_o$ such as that shown in FIG. 5 comprises two identical error control systems $M_1$ and $M_2$, such as that described and shown in FIG. 3. The associated elements $e_1$ and $e_2$ will receive the currents $i_1$ and $i_2$ so that:

$$i_1 + i_2 = i_{d1}$$

Likewise, the elements $e_3$ and $e_4$ will receive the currents $i_3$ and $i_4$ which will give:

$$i_3 + i_4 = i_{g1}$$

The currents $i_{d1}$ and $i_{g1}$ will supply the control system $M_1$ for controlling the centering of the beam F with respect to the axis $X_1X_1$ separating the electrodes $e_1$, $e_2$ from the electrodes $e_3$, $e_4$.

In a similar manner, currents $i_{d2}$ and $i_{g2}$ respectively equal to:

$$i_{d2} = i_2 + i_3$$

$$i_{g2} = i_1 + i_4$$

will supply the system $M_2$ for controlling the centering of the beam F with respect to an axis $X_2X_2$ perpendicular to the axis $X_1X_1$, the beam F sweeping in two orthogonal planes, the intersections of which planes with the electrodes $E_1$ and $E_2$ respectively coinciding with the axes $X_1X_1$ and $X_2X_2$.

In a similar manner, the electrodes $E_1$ and $E_2$ shown in FIG. 6 are respectively associated with two identical error control systems $M_1$ and $M_2$.

The two error control systems $M_1$ and $M_2$ respectively furnish the signals $V_{pM1}$ or $V_{nM1}$ and $V_{pM2}$ (or $V_{nM2}$) controlling the sweep control voltages $V_{BM1}$ and $V_{BM2}$ by means of scanning correctors $J_1$ and $J_2$ which are automatic correctors for example.

What we claim is:

1. A process for centering, with respect to a target of predetermined position, an ionizing radiation sweep beam subjected to a sweep control voltage $V_B$ in a predetermined plane, using at least one ionization chamber provided with at least one electrode divided into $2n$ electrically conductive elements, $n$ being an integer equal to or greater than 1, said elements being disposed symmetrically with respect to an axis perpendicular to the considered sweep plane, two adjacent elements being separated from each other by an insulating strip, all of the elements disposed on one side of said axis receiving an ionic current $i_d$ and all of the elements disposed on the other side of said axis receiving an ionic current $i_g$, said process comprising the following steps:

amplifying the voltage difference $v_d - v_g$ respectively corresponding to the currents $i_d$ and $i_g$ received at said electrode, the signal obtained being $V_E = k(v_d - v_g)$;

comparing the signal $V_E$ with threshold voltages $-v_e$ and $+v_e$;

comparing the beam sweep control voltage $V_B$ with threshold voltages $-v_b$ and $+v_b$;

detecting either a signal $V_p$ corresponding to the couple of values:

$$V_p \rightarrow \begin{matrix} V_E > +v_e \\ V_B < -v_b \end{matrix}$$

or a signal $V_n$ corresponding to the couple of values:

$$V_n \rightarrow \begin{matrix} V_E < -v_e \\ V_B > +v_b \end{matrix}$$

said detected signals $V_p$ or $V_n$ indicating the direction and amplitude of the deviation of the centering of the sweep beam with respect to the axis XX of the electrode;

correcting the sweep path of said beam, said correcting being related to the detected signal $V_p$ or $V_n$.

2. A sweep beam centering device for carrying out the process as claimed in claim 1, comprising at least an error control system and correcting means, said error control system comprising at least:

an amplifier $A_1$ delivering a signal $V_E$ corresponding to the difference between the voltages $v_d$ and $v_g$ respectively furnished by said ionic currents $i_d$ and $i_g$;

two comparators $B_1$ and $B_2$ for comparing the amplified signal $V_E = k(v_d - v_g)$ with threshold voltages $-v_e$ and $+v_e$, said comparator $B_1$ transmitting the signal $V_E > +v_3$ and said comparator $B_2$ transmitting the signal $V_E < -v_e$;

two comparators $C_1$ and $C_2$ comparing said beam sweep voltage $V_B$ with threshold voltages $-v_b$ and $+v_b$, the comparators $C_1$ and $C_2$ respectively transmitting the signals:

$$V_B < -v_b$$

$$V_B > +v_b$$

an "AND" gate ($P_p$) transmitting a signal $V_p$ corresponding to the couple of values:

$$V_E > +v_e$$

$$V_B < -v_b$$

an "AND" gate ($P_n$) transmitting a signal $V_n$ corresponding to the couple of values:

$$V_E < -v_e$$

$$V_B > +v_b$$

said correcting means comprising at least:

two diodes $D_p$ and $D_n$ for respectively transmitting the signals $V_p$ and $V_n$ to a correcting system effecting a correction of said beam sweep control voltage $V_B$, the direction and amplitude of this correction being being directly related to the detected signal namely either $V_p$ or $V_n$.

3. A device as claimed in claim 2, wherein one of the signals $V_p$ and $V_n$ is transmitted to an integrator $I_n$ associated with an automatic scanning corrector $J_n$ controlling the beam sweep control voltage.

4. A device as claimed in claim 2, said device being associated with four ($2n = 4$) elements, said elements being symmetrically disposed two by two with respect to two axes making therebetween an angle $\theta$, said elements being associated in pairs and the two pairs of elements being respectively associated with two said error control systems, said device permitting the control of the centering of the beam with respect to the center of the electrode located at the intersection of the two axes.

5. A device as claimed in claim 4, said device being associated with an ionization chamber provided with an electrode divided into four elements $e_1$, $e_2$, $e_3$, $e_4$, the currents $i_{dM1}$ and $i_{gM1}$ being respectively received by the pairs of electrodes $e_1$, $e_2$ and $e_3$, $e_4$ furnishing the voltages $v_{dM1}$ and $v_{gM1}$ and the currents $i_{dM2}$ and $i_{gM2}$ being respectively received by the pairs of electrodes $e_1$, $e_3$ and $e_2$, $e_4$ furnishing the voltages $v_{dM2}$ and $v_{gM2}$ ; said pairs of voltage $v_{dM1}$, $v_{gM1}$ and $v_{dM2}$, $V_{gM2}$ being respectively applied to two said error control systems.

6. A device as claimed in claim 4, said device being associated with a first ionization chamber provided with an electrode divided into two elements $e_{11}$ and $e_{12}$ placed on each side of an axis $X_1X_1$ and with a second ionization chamber provided with an electrode divided into two elements $e_{21}$ and $e_{22}$ placed on each side of an axis $X_2X_2$, said two elements $e_{11}$ and $e_{12}$ respectively furnishing voltages $v_{d1}$ and $v_{g1}$ and the elements $e_{21}$ and $e_{22}$ respectively furnishing voltages $v_{d2}$ and $v_{g2}$ , said pairs of voltage $v_{d1}$, $v_{g1}$ and $v_{d2}$, $v_{g2}$ being respectively applied to two said error control systems which furnish error signals $V_{M1}$ or $V_{nM1}$ and $V_{M2}$ or $V_{nM2}$.

7. A device as claimed in claim 6, wherein the signals $V_{pM1}$ (or $V_{nM1}$) and $V_{pM2}$ (or $V_{nM2}$) are respectively transmitted to two integrators $I_1$ and $I_2$ which are respectively associated with automatic scanning correctors $J_1$ and $J_2$ controlling the beam sweep control voltages.

8. A device as claimed in claim 4, wherein $\theta = \pi/2$.

* * * * *